(12) United States Patent  
Boehm

(10) Patent No.: US 10,897,878 B2
(45) Date of Patent: Jan. 26, 2021

(54) SYSTEMS, DEVICES, AND/OR METHODS FOR MONITORING BIRDS

(71) Applicant: Thomas Boehm, Charlottesville, VA (US)

(72) Inventor: Thomas Boehm, Charlottesville, VA (US)

(*) Notice: Subject to any disclaimer, the term of this patent is extended or adjusted under 35 U.S.C. 154(b) by 61 days.

(21) Appl. No.: 15/784,165

(22) Filed: Oct. 15, 2017

(65) Prior Publication Data

US 2019/0110444 A1   Apr. 18, 2019

(51) Int. Cl.
| | |
|---|---|
| *A01K 31/14* | (2006.01) |
| *A01K 45/00* | (2006.01) |
| *A01M 29/10* | (2011.01) |
| *H04N 5/232* | (2006.01) |
| *A01M 29/16* | (2011.01) |
| *H04W 88/02* | (2009.01) |

(52) U.S. Cl.
CPC ............ *A01K 31/14* (2013.01); *A01K 45/00* (2013.01); *A01M 29/10* (2013.01); *A01M 29/16* (2013.01); *H04N 5/23216* (2013.01); *H04W 88/02* (2013.01)

(58) Field of Classification Search
CPC ...... A01K 31/14; A01K 45/00; A01K 31/002; A01K 31/005; A01K 31/06; A01K 31/07; A01K 31/08; A01K 31/18; A01K 31/19; A01K 31/22; A01K 1/00; A01K 1/031; A01M 29/10; A01M 29/16; H04N 7/185
See application file for complete search history.

(56) References Cited

U.S. PATENT DOCUMENTS

| 9,713,318 | B1* | 7/2017 | Albawi | A01K 31/04 |
|---|---|---|---|---|
| 2008/0178819 | A1* | 7/2008 | Sia | A01K 31/00 |
| | | | | 119/300 |
| 2012/0048206 | A1* | 3/2012 | Eakin | A01K 5/0275 |
| | | | | 119/515 |
| 2014/0182518 | A1* | 7/2014 | Boehm | A01K 31/007 |
| | | | | 119/429 |
| 2019/0216044 | A1* | 7/2019 | Mazzapica | H04N 5/783 |
| 2019/0254260 | A1* | 8/2019 | Nguyen | A01K 31/18 |

OTHER PUBLICATIONS

Marjorie Clark; 'Startup Weekend Champ Wants Science in Backyards'; one page; Nov. 4, 2014; 425 Business Journal; Bellevue Washington.†
Marjorie Clark; 'Bird Box Science Wins First at Bellevue Startup Weekend'; one page; Oct. 27, 2014; 425 Business Journal; Bellevue Washington.†

* cited by examiner
† cited by third party

*Primary Examiner* — Trinh T Nguyen
(74) *Attorney, Agent, or Firm* — Dale Jensen, PLC; Dale Jensen

(57) ABSTRACT

Certain exemplary embodiments can provide a method, which can comprise a plurality of activities, which can comprise automatically detecting the presence of a bird in a housing. The housing can be adapted to substantially surround the bird. The housing can define an aperture adapted for the bird to enter and exit the housing.

20 Claims, 5 Drawing Sheets

SYSTEMS, DEVICES, AND/OR METHODS FOR MONITORING BIRDS

BRIEF DESCRIPTION OF THE DRAWINGS

A wide variety of potential embodiments will be more readily understood through the following detailed description of certain exemplary embodiments, with reference to the accompanying exemplary drawings in which.

DETAILED DESCRIPTION

Figure 1:
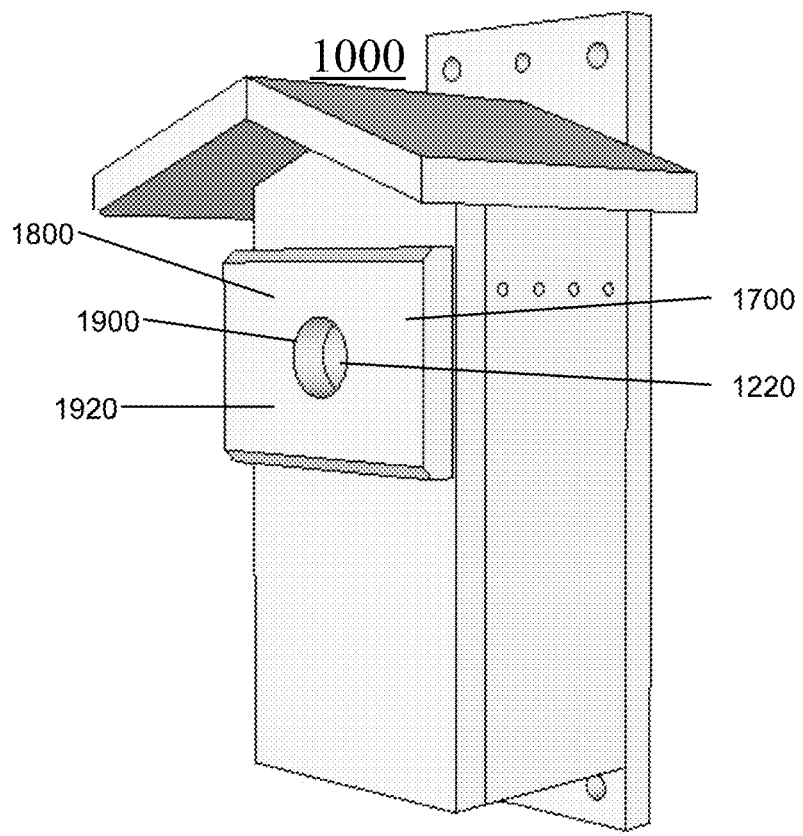
FIG. 1 is a drawing of a perspective view of an exemplary embodiment of a system 1000.
Figure 1A:
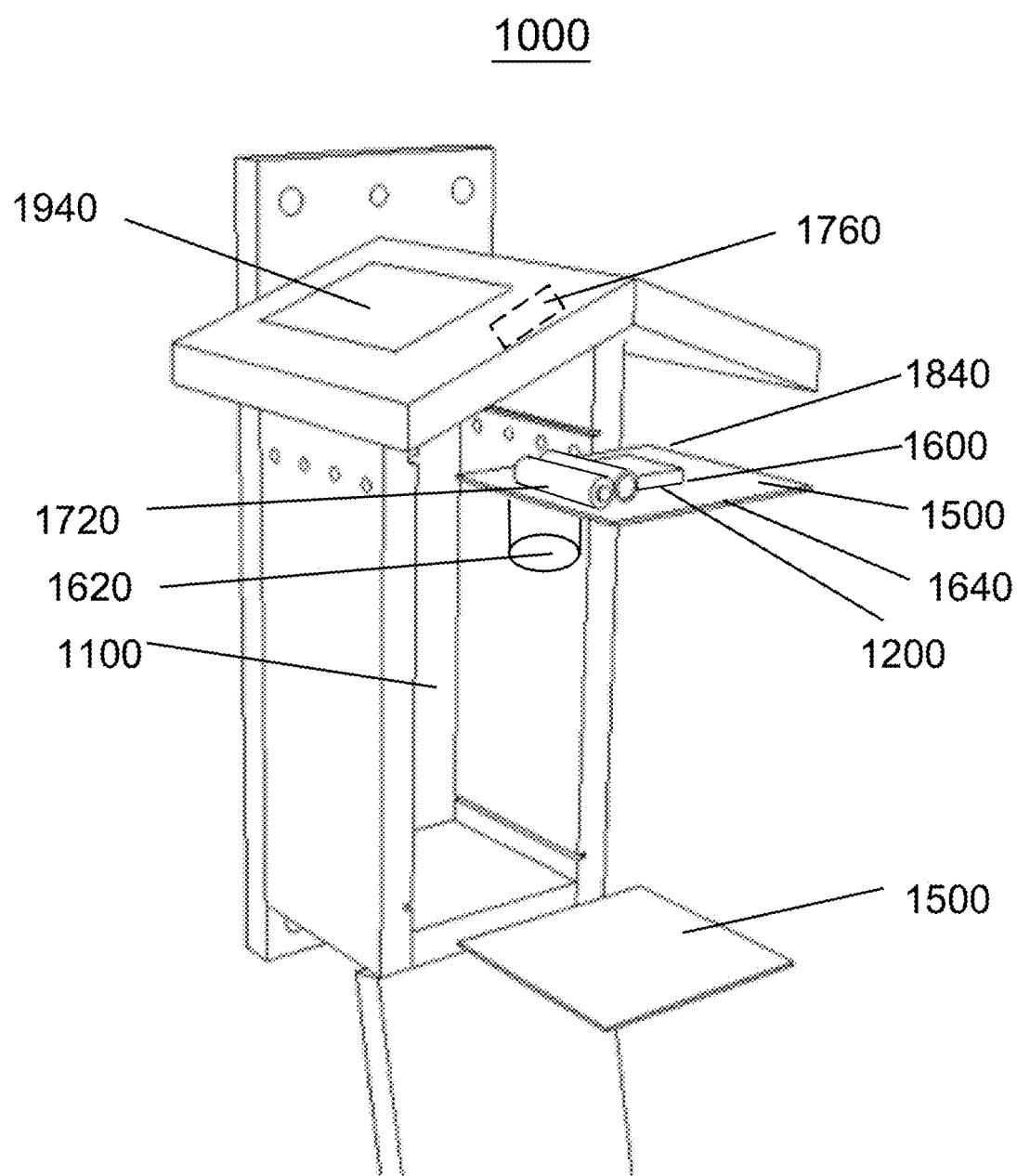
FIG. 1A is a drawing of a perspective view of system 1000 with the front wall opened for illustrative purposes.

FIG. 1 is a drawing of a perspective view of an exemplary embodiment of a system 1000. FIG. 1A is a drawing of a perspective view of system 1000 with the front wall opened for illustrative purposes. System 1000 can comprise aperture 1900 of different sizes depending on the type of bird desired. In certain exemplary embodiments, aperture 1900 can be associated with aperture cover 1920, which can be adapted to be automatically opened and closed via a closing mechanism 1700, which can receive energy from an energy source 1720. In certain exemplary embodiments, energy source 1720 can comprise batteries, which can be rechargeable. In certain exemplary embodiments, batteries comprised by energy source 1720 can be recharged via a solar cell such as solar cell 1940 of FIG. 1A. Closing mechanism 1700 can be battery powered and can close aperture cover 1920 responsive to a signal from a user and/or an automatic detection of an unwanted bird species (e.g., a sparrow or starling, etc.). When aperture cover 1920 is closed, all or part of birdhouse 1100 can be a capture compartment. System 1000 can comprise an annunciator 1600, which can be any device or system capable of emitting an audible sound. For example, annunciator 1600 can be a buzzer, speaker, and/or miniature electronic audio player with prerecorded sounds etc. System 1000 can comprise a light 1640, which is constructed to illuminate birdhouse 1100 in low light conditions. The light may be infrared or similar technology. System 1000 comprises an annunciator 1600.

System 1000 can comprise a compartmented door control unit 1800, which can be driven by a battery powered motor 1200, solenoid or similar device. Battery powered motor 1200 can be operatively coupled to the door 1220. Battery powered motor 1200 can control the door 1220. System 1000 can comprise a circuit board 1500, which can be an electronic module. Circuit board 1500 can be adapted to control motion of door 1220 loudness of annunciator 1600, camera, lighting, sensors, communications, and/or an environmental control system 1840. In certain exemplary embodiments, environmental control system 1840 can be adapted to heat and/or cool system 1000.

Certain exemplary embodiments provide an electronic birdhouse 1100 that allows the user to view the activity inside the birdhouse using their TV, cell phone, iPad (iPad is a registered trademark of Apple Inc. of Cupertino, Calif.), computer or other wireless devices. The communications between a user and) birdhouse 1100 can be wireless using Wi-Fi, Bluetooth, IoT (Internet of Things) and/or other wireless technologies. Not only can a user monitor audio and video activity inside of birdhouse 1100, but also the user can turn on and off certain features of the birdhouse.

Webcam houses or camera houses have wires that utilize a physical connection between birdhouse 1100 and a monitoring device such as a TV (e.g., TV 3500 of FIG. 3) and/or information device (e.g., information device 3100 of FIG. 3), etc. Most people have smartphones (e.g., personal data accessory 3200 of FIG. 3) nowadays so using smartphones as monitoring devices makes sense.

Many birdhouses comprise wood. Certain exemplary embodiments comprise polyvinylchloride ("PVC") plastic that won't rot, warp or deteriorate over a few years. Certain exemplary embodiments comprise electronic sensors, cameras, and/or wireless communications. Certain exemplary webcams utilize a cord to supply power. Certain exemplary embodiments comprise an energy source 1720. Exemplary birdhouses can be scalable starting with just a basic design with no electronics up to the top of the line model with many options including an embedded microcontroller.

Certain exemplary embodiments provide an alternative approach and construction and can provide new features. Certain exemplary embodiments can limit the size of bird that can enter. For example, a size of apertures 1900 can limit the size of bird that can enter. Certain exemplary embodiments comprise light 1640 inside of birdhouse 1100 so camera 1620 can view in the dark. Light 1640 can be infrared or other technology that allows night vision.

Certain exemplary embodiments turn on a loud audio sound (e.g., via annunciator 1600) via and or light (e.g., via light 1640) to scare away unwanted birds. Certain exemplary embodiments can open and close door (e.g., apertures 1900) to allow entry of desired birds and to trap unwanted birds such as house sparrows or starlings, which can be detected via camera 1620 and/or a determination of the bird's species based upon detected sound of the bird. Certain exemplary embodiments comprise can automatically detect and identify a specific species of bird and allow or deny entry into birdhouse 1100.

Certain exemplary embodiments comprise circuit board 1500 that slide in and out of the house to perform specific tasks. Some of these tasks are data loggers to monitor temperature, humidity, light, sound, motion, etc. RFID (Radio Frequency Identification) for birds that are tagged with RFID technology tags.

In certain exemplary embodiments, energy source 1720 can comprise and/or be electrically coupled to one or more of batteries, solar cells, windmill generator, fuel cells, and/or any form of potential energy such as a raised weight or coiled spring or a combination of several of these, etc.

Figure 3:
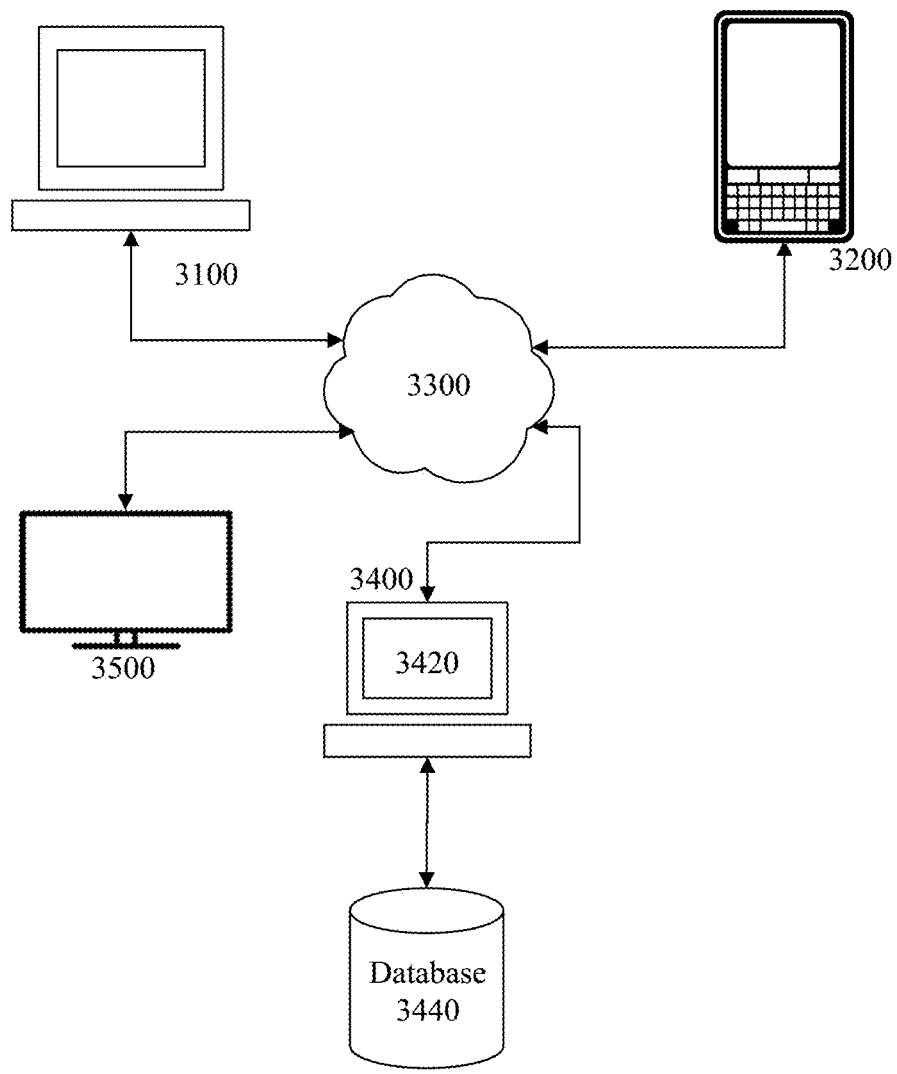
FIG. 3 is a block diagram of an exemplary embodiment of a system 3000.

In certain exemplary embodiments, system 1000 comprises birdhouse 1100, which constructed to electronically transmit audio and video information wirelessly (e.g., via wireless transceiver 1760) to a network (e.g., network 3300 of FIG. 3) or an information device (e.g., information device 3100 of FIG. 3). At least one circuit board 1500 slidably coupleable to birdhouse 1100, wherein at least one circuit board 1500 is constructed to operate camera 1620 that automatically takes one or more pictures and videos and stores such pictures and videos on a memory device (e.g., memory devices 4300 of FIG. 4). At least one circuit board 1500 is constructed to operate as a data logger that records temperature, humidity, light intensity, motion detection, and whether the birdhouse is occupied or unoccupied.

A wireless transceiver 1760 can be communicatively coupleable to at least one information device (e.g., information device 3100 of FIG. 3), wherein the information device (e.g., information device 3100 of FIG. 3) provides a user interface (e.g., user interface 3420 of FIG. 3) allowing a user to cause camera 1620 of birdhouse 1100 to take pictures. The user interface (e.g., user interface 3420 of FIG. 3) can allow the user to cause camera 1620 in the birdhouse to take videos. The user interface (e.g., user interface 3420 of FIG. 3) can allow the user to cause electronic systems (e.g., at least one circuit board 1500) in birdhouse 1100 to open aperture cover 1920 of birdhouse 1100. The user interface (e.g., user interface 3420 of FIG. 3) allowing the user to cause electronic systems (e.g., at least one circuit board 1500) in birdhouse 1100 to close aperture cover 1920 of birdhouse 1100. The user interface (e.g., user interface 3420 of FIG. 3) can allow the user to cause electronic systems (e.g., at least one circuit board 1500) in birdhouse 1100 to turn on and/or off an annunciator that attracts or repels certain species of birds.

Certain exemplary embodiments provide an information device c (e.g., information device 3100 of FIG. 3) constructed to automatically identify a species of a bird based upon information received from sensors comprising one or more of: motion; sound; light; capacitive touch; pressure; shape recognition camera; infrared camera; and/or automatic color recognition, etc. The information device (e.g., information device 3100 of FIG. 3) can be constructed to allow or deny entry of the bird into the birdhouse based upon the species of the bird.

Figure 2:
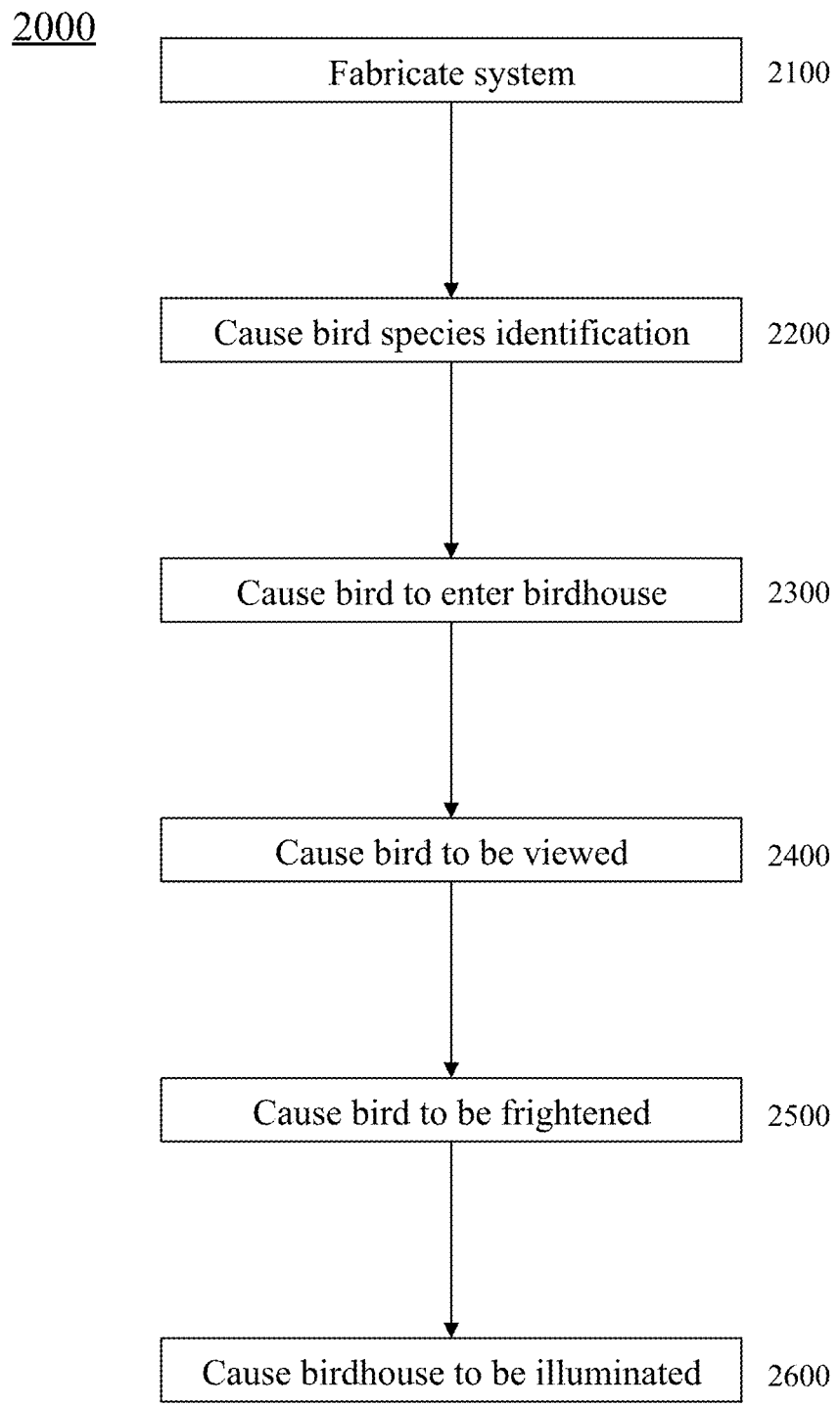
FIG. 2 is a flowchart of an exemplary embodiment of a method 2000.

FIG. 2 is a flowchart of an exemplary embodiment of a method 2000. At activity 2100, an automated birdhouse system can be fabricated.

At activity 2200, certain exemplary embodiments can cause a species of a bird to be identified. At activity 2300, certain exemplary embodiments can cause a bird to enter the birdhouse. For example, a door to the birdhouse can be opened responsive to a determination that the species of bird is one desired for entry. Conversely, the door to the birdhouse can remain closed responsive to a determination that the species of bird is one not desired for entry.

At activity 2400, certain exemplary embodiments can cause a bird to be viewed via a camera. At activity 2500, certain exemplary embodiments can cause a bird to be frightened responsive to a determination that the bird is of an unwanted species. At activity 2600, certain exemplary embodiments can cause the birdhouse to be illuminated.

Certain exemplary embodiments can automatically detect a presence of a bird in a housing, such as via a motion sensor. The housing can be adapted to substantially surround the bird. The housing can define an aperture adapted for the bird to enter and/or exit the housing.

Certain exemplary embodiments limit the size of bird that can enter the birdhouse. Certain exemplary embodiments provide notice of when birds have entered the birdhouse. Certain exemplary embodiments use building materials that won't warp, rot, or rust and never need to be painted and/or repainted.

The birdhouse can be built out of materials that resist the elements of the weather such as plastic, aluminum, stainless steel, etc. The Hole in the external wall of the birdhouse limits the size of the birds that enter.

The roof or wall of the birdhouse can be hinged. Several circuit boards can slide up and out using grooves that are cut into the walls. The floor and ceiling can slide out using two horizontal grooves that are cut into the same walls.

The power source for the birdhouse can be batteries, solar, fuel cell, wind, any form of potential energy such as a raised weight or coiled spring or a combination of several of these.

The birdhouse can utilize sensors such as motion, touch including capacitive, optical including cameras for shape or pattern recognition, heat including inferred, pressure, RFID (Radio-Frequency Identification) tag etc. Any sensor can be wired or wireless. A camera may be a webcam.

The birdhouse can utilize remote control technology for opening the birdhouse door, taking pictures, and/or live video, etc.

One of the unique features of this birdhouse is the notification that it sends wirelessly notifying a user that birds are in or around the birdhouse. This is accomplished through the motion sensor that sends a radio signal to a receiver of the user that sets off an alarm, such as a chime. Then the bird can be identified and action can be taken based upon that identification.

FIG. 3 is a block diagram of an exemplary embodiment of a system 3000, which can comprise an information device 3100, which can be adapted to receive a signal from and/or send a signal to a birdhouse system, such as system 1000 of FIG. 1. Information device 3100 can be communicatively coupled, via a network 3300, to a personal data accessory 3200, which can be a smart phone in certain exemplary embodiments. For example, a user can receive a signal from system 1000 indicating the presence of a bird in birdhouse 1100. Information device 3100 and/or personal data accessory 3200 can be used to adjust and/or trigger a timer in system 1000 in order to transmit a video of birds to a user. As another example, information device 3100 can be communicatively coupled (e.g., wirelessly) to circuit board 1500 of FIG. 1 and can provide information and/or settings associated with the control of system 1000. System 3000 can comprise a server 3400, which can comprise a user interface 3420. Server 3400 can be communicatively coupled to a database 3440, which can act as a repository for information obtained from system 1000.

Figure 4:
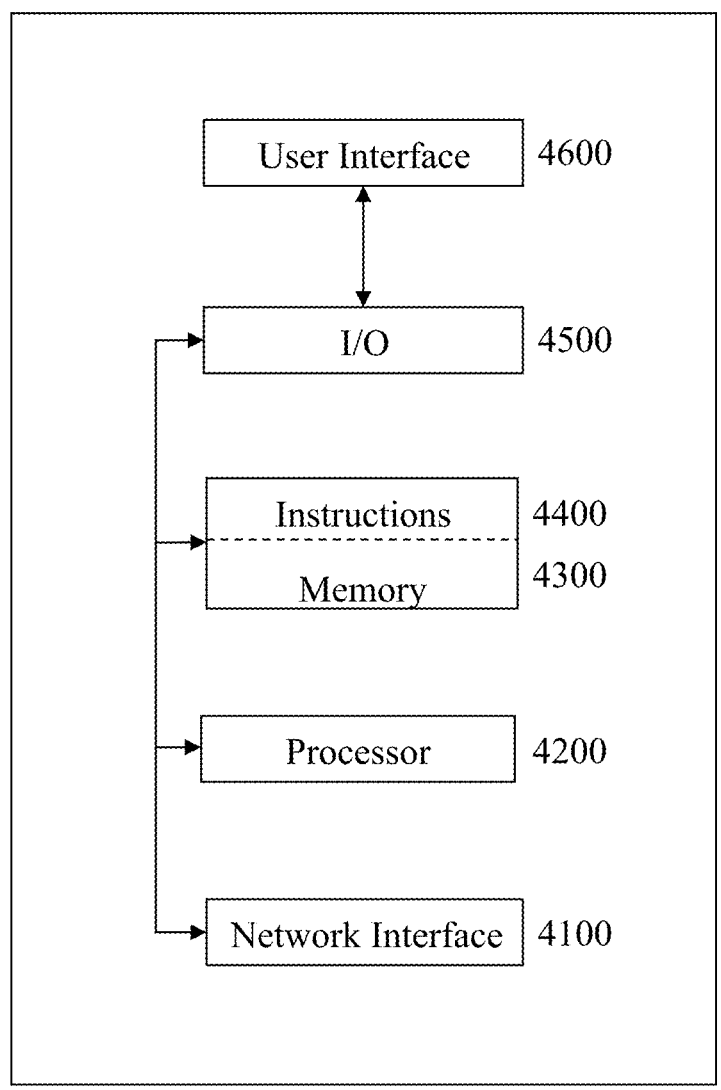
FIG. 4 is a block diagram of an exemplary embodiment of an information device 4000.

FIG. 4 is a block diagram of an exemplary embodiment of an information device 4000, which in certain operative embodiments can comprise, for example, server 3400 or information device 3100, of FIG. 3. Information device 4000 can comprise any of numerous circuits and/or components, such as for example, one or more network interfaces 4100, one or more processors 4200, one or more memory devices 4300 for storing pictures and or videos or for containing instructions 4400, one or more input/output devices 4500, and/or one or more user interfaces 4600 coupled to one or more input/output devices 4500, etc.

In certain exemplary embodiments, via one or more user interfaces 4600, such as a graphical user interface, a user can view a rendering of information related to a birdhouse system such as system 1000 of FIG. 1.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, step, and/or process or portion thereof adapter—a device used to effect operative compatibility between different parts of one or more pieces of an apparatus or system.
adjust—to change a setting of.
and/or—either in conjunction with or in alternative to.
annunciator—a device and/or system constructed to emit an audio and/or video signal.
aperture—an opening.
apparatus—an appliance or device for a particular purpose.
attract—to cause to come to a place.
audio—a noise that can be heard by a human or animal.
automatically—acting or operating in a manner essentially independent of external influence or control. For example, an automatic light switch can turn on upon "seeing" a person in its view, without the person manually operating the light switch.
available—readily accessible.
battery powered motor—a system that uses electrical energy from an electrolytic cell to impart motion to something.
bell—a device or system adapted to generate a noise that is audible to a human or an animal.
birdhouse—a structure, which often resembles a house, constructed to allow a bird to make its nest in.
camera—an instrument constructed to record and/or capture images.
can—is capable of, in at least some embodiments.
capacitive touch—a surface constructed to emit a signal responsive to electrical properties of a human body.
capture—to snare or gain control over.
capture compartment—a chamber adapted to prevent escape.
cause—to produce an effect.
circuit board—a system that mechanically supports and electrically connects electronic components using conductive tracks, pads and other features etched from copper sheets laminated onto a non-conductive substrate.
clean—to remove dirt or extraneous substances.
close—to cover an aperture to substantially prevent ingress and/or egress.
color recognition—identification of a wavelength range of visible light.
compartmented—having a plurality of chambers.
comprising—including but not limited to.
conceal—to hide.
configure—to make suitable or fit for a specific use or situation.
connect—to join or fasten together.
constructed to—made suitable or fit for a specific use or situation.
cool—to lower a temperature of
couple—to join, connect, and/or link together in some fashion.
cover—a thing that lies on or over an aperture in order to control ingress and/or egress via the aperture.
data logger—an electronic system that records data over time or in relation to location either with a built in instrument or sensor or via external instruments and sensors.
define—to establish the outline, form, or structure of
detect—to discover or ascertain the presence of.
determine—to obtain, calculate, decide, deduce, and/or ascertain.
device—a machine, manufacture, and/or collection thereof.
electronically—of, relating to, or controlled by computers or computerized systems.
enter—to go into.
exit—to go out of.
expose—to present to view and contact with.
fill—to place substances in to substantially occupy available space.
floor—a substantially level surface upon which birds stand when in a housing.
gear—a part, as a disk, wheel, or section of a shaft, having cut teeth of such form, size, and spacing that they mesh with teeth in another part to transmit or receive force and impart motion.
groove—a long, narrow cut or indentation in a surface, as the cut in a board to receive the tongue of another board.
haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.
heat—to increase a temperature of.
hinged—a jointed device on which a door, gate, shutter, lid, or other attached part turns, swings, or moves.
housing—a shelter adapted to keep an animal or human at least in part from environmental elements.
humidity—a quantity representing the amount of water vapor in the atmosphere or a gas.
information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.
infrared camera—a device that forms an image using infrared radiation, similar to a camera that forms an image using visible light. Instead of the 400-700 nanometer range of the visible light camera, infrared cameras operate in wavelengths as long as 14,000 nm (14 μm).

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

instruct—to furnish with directions.

install—to connect or set in position and prepare for use.

light—a natural agent that stimulates sight and makes things visible.

light intensity—a measure of wavelength-weighted power emitted by a light source.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

motion—a process via which something changes position from one location to another.

motion sensor—a system adapted to generate a signal in response to detecting a movement of something.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

occupied—having a bird present and/or being used by a bird.

close—to uncover an aperture to allow ingress and/or egress opening—a gap, hole, or aperture.

operate—to control a function of.

operatively—in a manner allowing for operation.

picture—an image representative of something.

place—to position something.

plurality—the state of being plural and/or more than one.

predetermined—established in advance.

presence—a state of existing at a location.

pressure—a force applied to a surface.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

provide—to furnish, supply, give, and/or make available.

receive—to get as a signal, take, acquire, and/or obtain.

record—to set down in some tangible form (e.g., store in a memory device) for later reference.

removable—capable of being taken apart in a substantially non-destructive manner.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repel—to cause to leave a place.

request—to express a desire for and/or ask for.

restrain—to limit or hamper movement.

roof—an upper covering of a housing.

rotate—to cause to turn around an axis.

set—a related plurality.

shape recognition camera—a camera comprising machine instructions that cause an identification of a bird species based upon a detected shape of a bird.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

slidably—capable of being moved along in substantially continuous contact with a relatively smooth surface.

sound—vibrations that travel through the air or another medium and can be heard when they reach a person's or animal's ear.

species—a group of living organisms consisting of similar individuals capable of exchanging genes or interbreeding.

store—to place, hold, and/or retain data, typically in a memory.

substantially—to a great extent or degree.

support—to bear the weight of, especially from below.

surround—to enclose on substantially all sides.

system—a collection of mechanisms, devices, machines, articles of manufacture, processes, data, and/or instructions, the collection designed to perform one or more specific functions.

temperature—a measure of kinetic energy of a substance.

time interval—a time period.

timer—system adapted to monitor time and provide a signal at a predetermined time or time interval.

transceiver—a device comprising both a transmitter and a receiver that are combined and share common circuitry or a single housing.

transmit—to send as a signal, provide, furnish, and/or supply.

transparent—capable of being seen through by a human or animal.

trigger—to initiate an event.

turn—to cause a rotation of.

occupied—not having a bird present and/or not being used by a bird.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

video—a sequential set of images that, when rendered, can be seen by a human or animal and that, when rendered sequentially at a determined rate, appear to a human as if one or more things are moving.

wall—an upright construction having a length much greater than the thickness and presenting a continuous surface except where pierced by apertures, windows, etc.; used for shelter, protection, to support floors, roofs, or the like, to fence in an area, etc.

wireless—any data communication technique that utilizes electromagnetic waves emitted by an antenna to communicate data (i.e., via an unguided medium), including such data communication techniques as sonar, radio, cellular, cellular radio, digital cellular radio, ELF, LF, MF, HF, VHF, UHF, SHF, EHF, radar, microwave, satellite microwave, laser, infrared, etc., and specifically excluding human voice radio transmissions, the data communication technique having a carrier frequency ranging from about 1 Hz to about $2 \times 10^{14}$ Hz (about 200 terahertz), including all values therebetween, such as for example, about 40 Hz, 6.010 kHz, 8.7 MHz, 4.518 GHz, 30 GHz, etc. and including all subranges therebetween, such as for example, from about 100 kHz to about 100 MHz, about 30 MHz to about 1 GHz, about 3 kHz to about 300 GHz, etc. Wireless communications can include analog and/or digital data, signals, and/or transmissions.

weight—a value indicative of importance.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;
 no characteristic, function, activity, or element is "essential";
 any elements can be integrated, segregated, and/or duplicated;
 any activity can be repeated, any activity can be performed by multiple entities, and/or any activity can be performed in multiple jurisdictions; and
 any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
 a birdhouse, the birdhouse comprising a door;
 a camera coupled to the birdhouse;
 sensors coupled to the birdhouse; and
 at least one circuit board slidably coupleable to the birdhouse, the at least one circuit board constructed to:
  operate the camera to automatically take pictures, videos, and audio and store the pictures, videos, and audio on a memory device; and
  automatically open or close the door of the birdhouse to capture or repel a bird of an unwanted species, a species of the bird automatically identified as the unwanted species based upon:
  an analysis of a shape, color, size, and weight of the bird by the information device, the shape, color, size, and weight of the bird automatically obtained from the sensors.

2. The system of claim 1, wherein:
 wherein the birdhouse comprises polyvinyl chloride, stainless steel, or aluminum.

3. The system of claim 1, wherein:
 wherein the bird is repelled via sound from an annunciator.

4. The system of claim 1, wherein:
 wherein the bird is captured via closure of the door.

5. The system of claim 1, wherein:
 wherein the birdhouse comprises a sensor that detects birds tagged with Radio-Frequency Identification tags.

6. The system of claim 1, wherein:
 a signal from a user interface causes electronic systems in the birdhouse to turn off an annunciator that repels certain species of birds.

7. The system of claim 1, wherein:
 the birdhouse comprises an environmental control subsystem that automatically heats or cools the birdhouse responsive to a signal from a temperature sensor.

8. The system of claim 1, wherein:
 the birdhouse is constructed to transmit images and audio to a cell phone, or tablet including images obtained via night vision.

9. The system of claim 1, wherein:
 the birdhouse is constructed to transmit images and audio to a TV.

10. The system of claim 1, wherein:
 the birdhouse is constructed to transmit images and audio to a computer.

11. The system of claim 1, wherein:
 a user causes pictures to be taken at the birdhouse via remote control technology; and
 a data logger that keeps track of the activity in and around the birdhouse; and
 data is transmitted from the birdhouse and viewed remotely on a cell phone.

12. The system of claim 1, wherein:
 a user causes live video and audio to be taken at the birdhouse via remote control technology.

13. The system of claim 1, wherein:
 a user causes the door of the birdhouse to be opened or closed via remote control technology.

14. The system of claim 1, wherein:
 the birdhouse comprises solar power.

15. The system of claim 1, wherein:
 the birdhouse comprises rechargeable batteries.

16. The system of claim 1, wherein:
 the birdhouse comprises a fuel cell for power.

17. The system of claim 1, further comprising:
 the sensors detect at least one of temperature, humidity, and motion, the sensors constructed to transmit a signal to the at least one circuit board.

18. A system comprising:
a birdhouse, the birdhouse comprising a door;
a camera coupled to the birdhouse;
sensors coupled to the birdhouse; and
at least one circuit board slidably coupleable to the birdhouse, the at least one circuit board constructed to operate the camera that automatically takes pictures, videos, and audio and stores the pictures, videos, and audio on a memory device; and
responsive to signals from a sensor, the at least one circuit board constructed to automatically open or close the door of the birdhouse to capture or repel a bird of an unwanted species, a species of the bird automatically identified as the unwanted species based upon an analysis of a shape, color, size, and weight of the bird by the at least one circuit board, the shape, color, size, and weight of the of the bird automatically obtained from the sensors.

19. A system comprising:
a birdhouse, the birdhouse comprising a door;
a camera coupled to the birdhouse;
sensors coupled to the birdhouse; and
at least one circuit board slidably coupleable to the birdhouse, the at least one circuit board constructed to:
operate the camera that automatically takes pictures, videos, and audio and stores the pictures, videos, and audio on a memory device; and
automatically open or close the door of the birdhouse to capture or repel a bird of an unwanted species, the species of the bird automatically identified as the unwanted species based upon an analysis of a shape, color, size, and weight of the bird by the at least one circuit board, the shape, color, size, and weight of the bird automatically obtained from sensors.

20. The system of claim 19 wherein:
the door is opened or closed based upon sensor information that detects the shape, color, size, and weight of the bird.

* * * * *